US007323981B2

(12) United States Patent
Peel et al.

(10) Patent No.: US 7,323,981 B2
(45) Date of Patent: Jan. 29, 2008

(54) CONTAINER TRACKING SYSTEM

(75) Inventors: John W. Peel, Frederick, MD (US); Tell A. Gates, Falls Church, VA (US); Thomas R. Topping, Phoenix, AZ (US)

(73) Assignee: Global Statistics, Inc., Chantilly, VA (US)

( * ) Notice: Subject to any disclaimer, the term of this patent is extended or adjusted under 35 U.S.C. 154(b) by 111 days.

(21) Appl. No.: 10/781,799

(22) Filed: Feb. 20, 2004

(65) Prior Publication Data

US 2004/0174259 A1 Sep. 9, 2004

Related U.S. Application Data

(60) Provisional application No. 60/448,142, filed on Feb. 20, 2003.

(51) Int. Cl.
*G08B 1/08* (2006.01)
*H04Q 7/00* (2006.01)

(52) U.S. Cl. ............................ 340/539.13; 340/539.1; 340/572.1; 340/571

(58) Field of Classification Search .............. 340/572.1
See application file for complete search history.

(56) References Cited

U.S. PATENT DOCUMENTS 5,682,139 A * 10/1997 Pradeep et al. ........ 340/539.13
5,774,876 A * 6/1998 Woolley et al. .......... 340/572.1
5,835,377 A * 11/1998 Bush ........................... 700/99
5,892,441 A * 4/1999 Woolley et al. ........ 340/539.26
5,917,433 A * 6/1999 Keillor et al. ............. 340/989
6,437,692 B1 * 8/2002 Petite et al. ................ 340/540
6,512,455 B2 1/2003 Finn et al. ............... 340/572.1
6,529,141 B1 3/2003 Hanebeck et al. .......... 340/988
6,556,138 B1 4/2003 Sliva et al. .............. 340/568.1
6,745,027 B2 * 6/2004 Twitchell, Jr. ........... 455/422.1
6,753,775 B2 * 6/2004 Auerbach et al. ...... 340/539.22
6,879,257 B2 * 4/2005 Hisano et al. ........... 340/568.2
6,900,732 B2 * 5/2005 Richards .................. 340/573.1
6,919,803 B2 * 7/2005 Breed .................... 340/539.14
6,954,145 B2 * 10/2005 Nakamura et al. .......... 340/553
6,972,682 B2 * 12/2005 Lareau et al. ............ 340/568.1
6,995,667 B2 * 2/2006 He et al. ............... 340/539.13
7,173,530 B2 * 2/2007 Lambright et al. ...... 340/572.8
2004/0113783 A1 * 6/2004 Yagesh .................... 340/568.1
2004/0174260 A1 * 9/2004 Wagner ................... 340/568.1

* cited by examiner

*Primary Examiner*—Benjamin C. Lee
*Assistant Examiner*—Eric M. Blount
(74) *Attorney, Agent, or Firm*—Manelli Denison & Selter PLLC; Dan Fiul

(57) ABSTRACT

Shipping containers are networked for transferring data between the shipping containers. The shipping containers include sensors for detecting hazardous conditions associated with the shipping containers. The hazardous condition sensed by any shipping container on a ship is transmitted through the network to a satellite transmitter and/or a radio transmitter for reporting to a central database.

3 Claims, 10 Drawing Sheets

CONTAINER TRACKING SYSTEM

The present application claims priority from U.S. Provisional Application No. 60/448,142, filed Feb. 20, 2003, entitled "Container Tracking System", the entirety of which is explicitly incorporated herein by reference.

BACKGROUND OF THE INVENTION

1. Field of the Invention

This invention relates generally to a container tracking system. More particularly, it relates to an apparatus and technique for allowing a shipping container to disburse sensor information through a network formed with other shipping containers.

2. Background of Related Art

Terrorism has brought the reality of threats outside of the United States possibly shipping hazardous substances such as biological, radioactive waste, nuclear, chemical, etc. into the United States for use in a terrorist act. Such possibilities have resulted in a need for increased security relating to shipping containers.

The U.S.'s maritime borders include 95,000 miles of open shoreline, and 361 ports. The U.S. relies on ocean transportation for 95 percent of cargo tonnage that moves in and out of the country. Each year more than 7,500 commercial vessels make approximately 51,000 port calls, and over six million loaded shipping containers enter U.S. ports. Current growth predictions indicate that container cargo will quadruple in the next twenty years.

FIG. 9 illustrates a conventional cargo hazard detection system for a package 900 within a truck 901.

The conventional cargo hazard detection system for a package 900 within a truck 901, includes a package hazard sensor 902, a satellite communications transmitter 903, a communications satellite 904, and a central database 908.

A package hazard sensor 902 monitors for potential hazards within the package 900 and transmits an alarm signal to the satellite communications transmitter 903.

The package hazard sensor 902 relies on radio frequency signal reflection or infrared light signal reflection to transmit its information to a satellite communications transmitter 903 attached to the top of the truck 901.

Once a determination is made that a potential hazardous substance inside of the package 900 has been detected by the package hazard sensor 902 the hazard signal is transmitted to the communications satellite 904. The communications satellite 904 relays the hazard signal produced by the hazard sensor 902 to the central database 908.

A user at the central database 908 is alerted as to the existence of the hazard signal and responds appropriately according to the type of hazard detected. For instance, if the hazard is a chemical leak, a chemical clean-up team is sent to investigate the shipping container and respond accordingly.

Thus, the prior art requires either signal reflection, using RF transmissions, or a line of sight using infrared transmissions, for a hazard sensor to relay its information to a central database.

FIG. 10 illustrates a conventional cargo ship.

The conventional cargo ship 1001 carries a plurality of conventional shipping containers 1002. The plurality of conventional shipping containers 1002 are placed within various parts of the ship 1001. Some of the conventional shipping containers 1002 are at the top of a stack 1003 of conventional shipping containers 1002. Some of the shipping containers are at the bottom of a stack 1004 of conventional shipping containers 1002.

On the conventional cargo ship 1001, there is a lack of sensors for determining potential hazards within the conventional cargo containers 1002.

Accordingly, there is a need to sense hazards aboard cargo ships before the cargo is placed on trucks for delivery. Moreover, there is a need to transmit sensor information from a shipping container when the shipping container is stacked underneath a plurality of other shipping containers. Moreover, there is a need to be able to transmit sensor information from a shipping container over a plurality of communication paths in the event that one of the communication paths is unavailable.

SUMMARY OF THE INVENTION

A Container Tracking System (CTS) that is based on an inexpensive terminal is attached to each shipping container and provides ongoing position tracking, intrusion detection, and hazardous substance monitoring. The CTS will interface with a variety of optional sensors that can provide chemical, biological, and nuclear detection capability with real-time reporting of the detection. The CTS detection equipment will also analyze the contents of the container and will report them back to the central database to match against a shipping manifest.

In accordance with the principles of the present invention, a shipping container tracking system comprises at least one shipping container sensor adaptively attached to a first shipping container to sense at least one of a condition of the first shipping container and a condition of at least one item within the first shipping container, a shipping container communication adapter to adaptively communicate With a second shipping container.

A method of distributing data obtained from sensors adaptively attached to a shipping container in accordance with another aspect of the present invention comprises establishing a network connection between a first shipping container and a second shipping container, and transmitting sensor data from the first shipping container to the second shipping container.

In accordance with the principles of yet another aspect of the present invention, a shipping container tracking system comprises at least one shipping container sensor adaptively attached to a first shipping container to sense at least one of a condition of the first shipping container and a condition of at least one item within the first shipping container, a shipping container communication adapter to adaptively communicate with a second shipping container, a satellite communication adapter, and a radio adapter. The shipping container tracking system transmits sensor data using one of the satellite communication adapter and the radio adapter, and if the transmission of the sensor data fails using one of the satellite communication adapter and the radio adapter, the shipping container tracking system transmits sensor data using the other of the satellite communication adapter and the radio adapter.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention overcomes the disadvantages of the prior art by networking shipping containers to allow information from any one shipping container to be more effectively transmitted to a radio signal path and/or a satellite. The invention is particularly useful for shipping containers being transported by a ship, where the shipping containers are stacked upon one another and the shipping containers within the hold of a cargo ship potentially can't transmit their information to a central database and/or the cargo ship's bridge.

The present invention provides an apparatus and method for determining hazard information related to a shipping container and relaying that hazard information to a central database, if necessary through other shipping containers. While being described herein as used with shipping containers for transport by a ship, the apparatus and method of the present invention is perfectly suited for other free-moving forms of transportation for shipping containers including, but not limited to, buses, vans, trucks, trains, etc.

Figure 1:
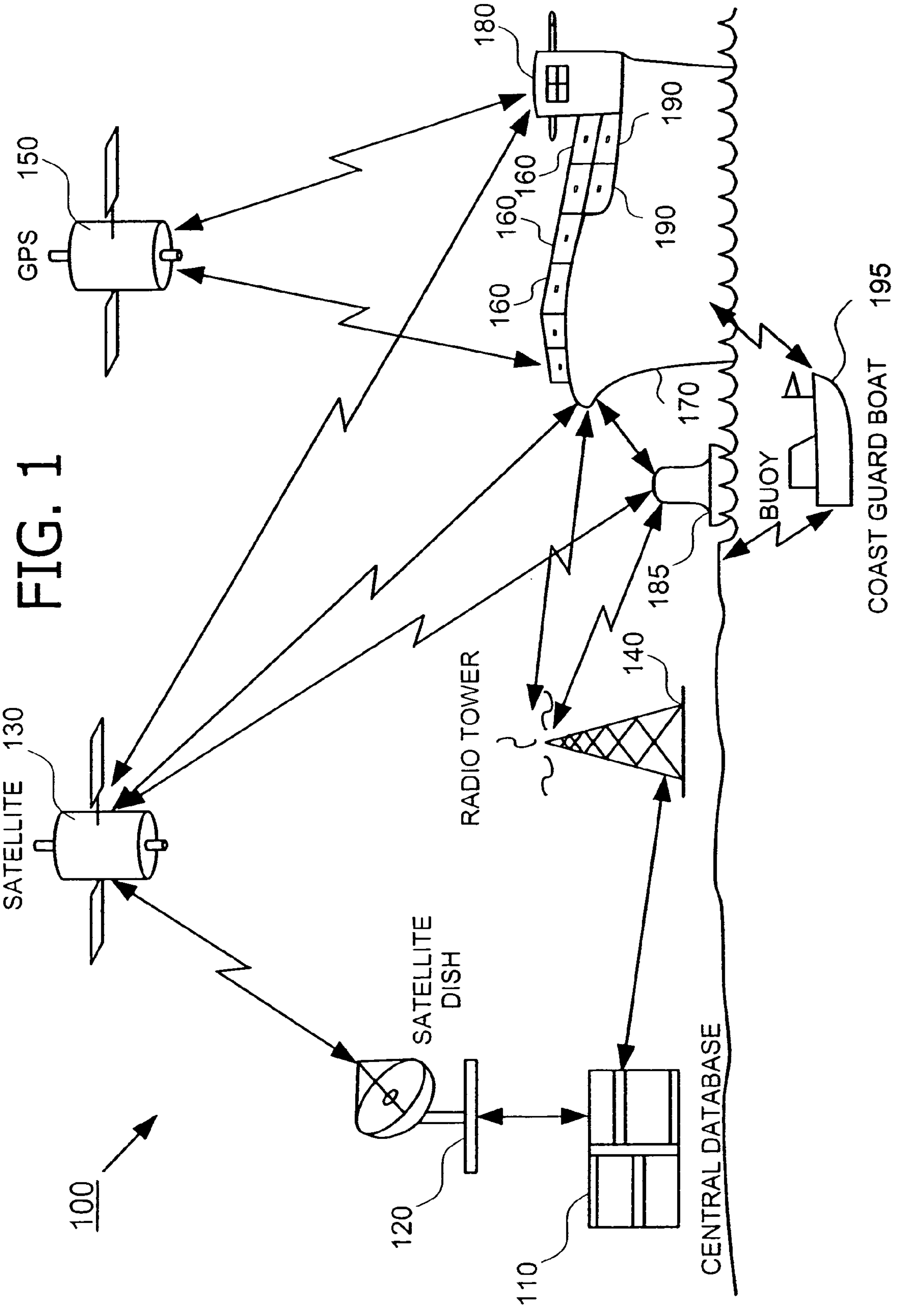
FIG. 1 shows a container tracking system, in accordance with the principles of the present invention.

FIG. 1 provides a system level view of the Container Tracking System (CTS), in accordance with the principles of the present invention.

In particular, as illustrated in FIG. 1, the Container Tracking System indicated generally at 100, is comprised of a central database 110, a satellite dish 120, a communications satellite 130, a radio tower 140, a Global Positioning System satellite system 150, shipping containers 160, a cargo ship 170 carrying the shipping containers 160, a ship's bridge 180, a communications buoy 185, a Coast Guard boat 195, and a terminal 190 attached to each shipping container 160.

Information about the cargo and the integrity of the shipping container 160 is determined by a terminal 190, described in more detail below in FIG. 2, attached to each shipping container 160.

If the terminal 190 attached to the shipping container 160 determines that a hazardous substance is aboard the ship 170 and/or that the integrity of one of the shipping containers 160 has been breached, an alarm signal is formed at the terminal 190.

A determination of the current location of the shipping container 160 is performed by terminal 190 by taking a reading from the GPS satellite system 150.

The alarm signal from terminal 190 attached to one of the shipping containers 160 is preferable transmitted to a first predetermined transmission path, e.g., communication satellite 130. Part of the satellite communication transmission path to the central database 110 includes the satellite dish 120.

The communication satellite 130 represents any currently available and future available communication satellites that include, e.g. Low Earth Orbiting (LEO) Constellations and Geo-Synchronous satellite systems.

If the preferable transmission path is unavailable for any reason, terminal 190 will try a second transmission path, e.g., a radio signal path to radio tower 140. The radio tower 140 is either in direct communication with a terminal 190 and/or ship's bridge 180 or indirectly through at least one at-sea communications buoy 185 radio tower that relay(s) radio transmissions to a shore-based radio tower 140 and/or a satellite communication path 130.

Using any available transmission path, the communication satellite 130, radio tower 140 or communications buoy 185, the alarm signal will be transferred from terminal 190 attached to a shipping container 160 aboard cargo ship 170 to a central database 110. The central database 110 is able to verify a content of a shipping container 160 by processing an alarm signal against a shipping manifest database.

The alarm signal is also transmitted to the ship's bridge 180 to alert the crew of cargo ship 170 that an alarm signal has been generated by a terminal 190 attached to the shipping container 160,. Preferably, a serial number for the terminal 190 attached to the shipping container 160 that issued the hazard signal is cross-referenced to a shipping container 160 identification number (ID) that is transmitted with the alarm signal. In this manner, the crew of the cargo ship 170 is warned of a possible hazardous condition that exists on the cargo ship 170, allowing them to take appropriate measures.

Preferably, Coast Guard boats 195 are also alerted to any alarm signals generated by a terminal 190 attached to a shipping container 160. Coast Guard boats 195 are equipped to receive an alarm signal directly from a terminal 190 that is within an appropriate range, a ship's bridge 180, a radio signal path including communications buoy 185 and radio tower 140, and a satellite communication path 130.

Alternately, a line of intermediary communications buoys 185 are be placed at sea at appropriate locations to test a container tracking system 100 functionality and/or to detect anomalies at a safe distance from port facilities, acting as a set of "trip wire" lines located strategically for U.S. Homeland Defense.

Figure 2:
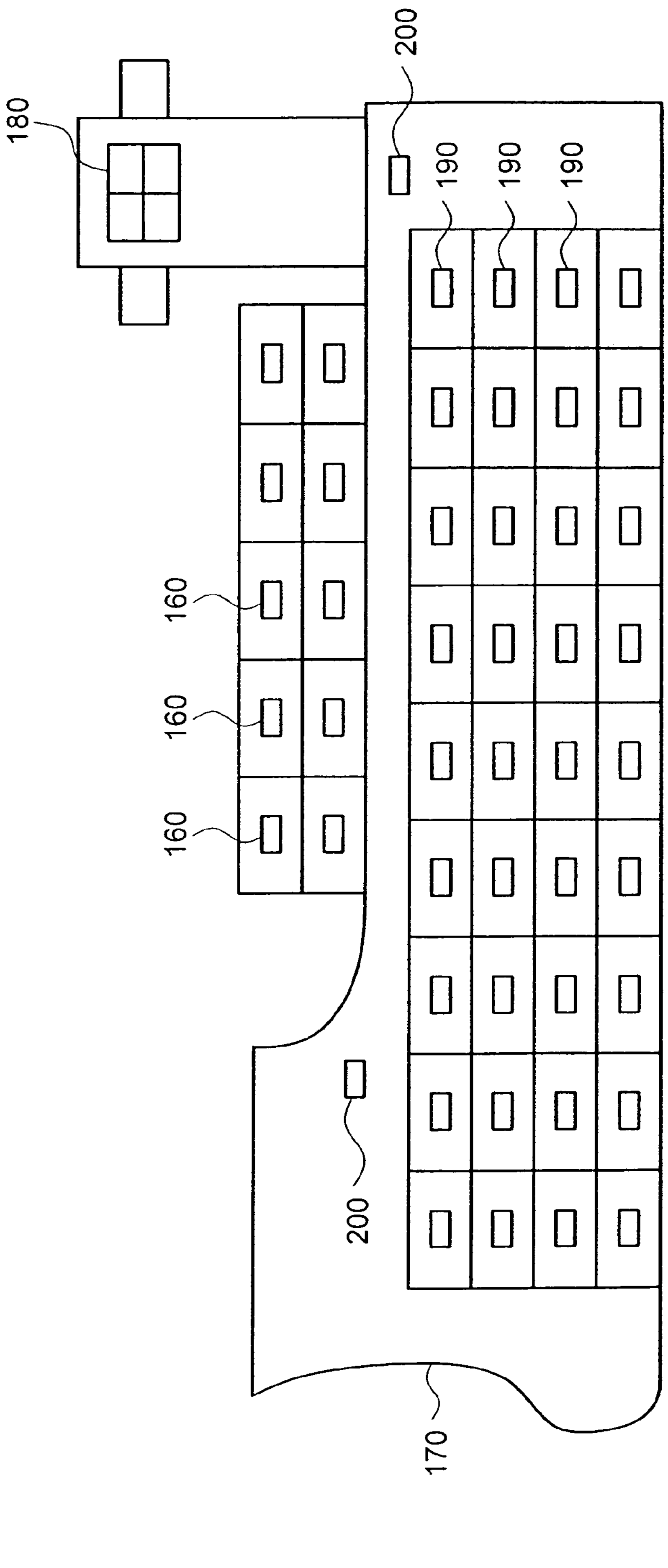
FIG. 2 is a detailed view of a cargo ship carrying shipping containers, in accordance with the principles of the present invention.

FIG. 2 shows a closer view of cargo ship 170 from FIG. 1. In particular, cargo ship 170 comprises a plurality of terminals 190 attached to the shipping containers 160 in communication with each other and the ship's bridge 180, potentially through repeaters/signal amplifiers 200.

The terminals 190 attached to each of the shipping containers 160 form an Ad-Hoc network after being placed aboard the cargo ship 170. The terminals 190 are either hard-wired together to form the Ad-Hoc network or wirelessly form an Ad-Hoc network.

A hard-wired network using, e.g., Ethernet, RS-232 connection, Token Ring, etc. requires either manually connecting shipping containers together with a cable or using the metal structure of the shipping container itself as a transmission media, similar to a HomePNA network or a HomePlug network. Preferably, a wireless network such as, e.g., an Ultra-Wide-Band wireless network, a Wi-Fi network, and/or a Bluetooth piconet is used to form the Ad-Hoc network connecting the terminals 190 attached to the shipping containers 160.

The terminals 190 are connected to other terminals 190 either directly and/or through the repeaters/signal amplifiers 200 placed at strategic locations throughout the ship 170. The repeaters/signal amplifiers 200 are used to assist in the creation of a wireless Ad-Hoc network when a terminal 190 is unable to directly communicate with another terminal 190 because of, e.g., interference, distance, etc.

Figure 3:
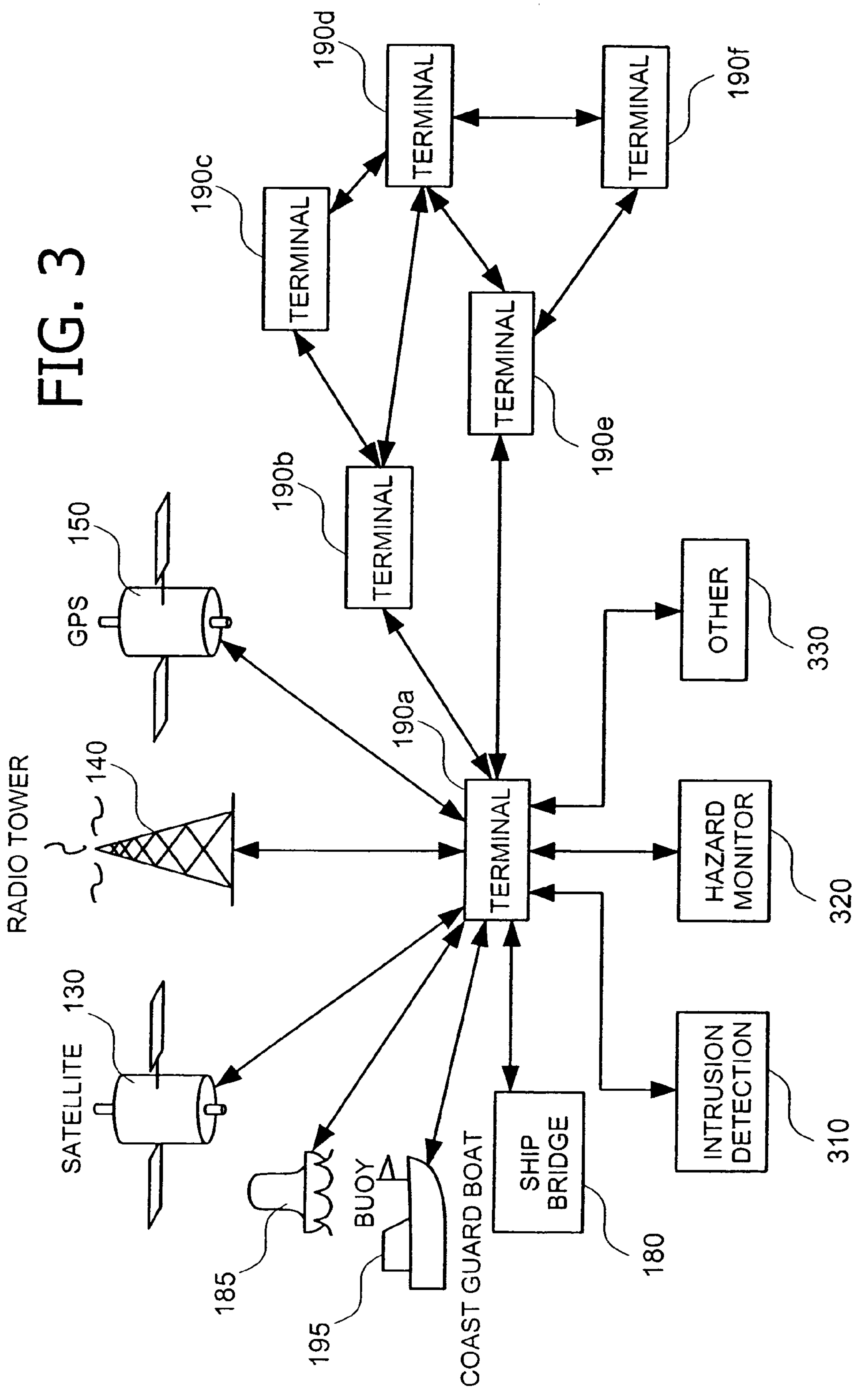
FIG. 3 is a block diagram of terminal interconnectivity as utilized by the container tracking system, in accordance with the principles of the present invention.

FIG. 3 illustrates terminals 190*a*-190*f* interconnected to form an Ad-Hoc network. Although only terminal 190*a* is shown for simplicity to be in communication with a communications satellite 130, a GPS satellite system 150, a ship's bridge 180, communications buoy 185, a Coast Guard boat 195, an intrusion detection sensor 310, a hazard sensor 320, and other miscellaneous sensors 330, all of the terminals 190*a*-190*f* have the same capability as terminal 190*a*.

Once the terminals 190*a*-190*f* are either hard-wired together to form a hard-wired Ad-Hoc network or placed in proximity to one another to form a wireless Ad-Hoc network, terminals 190*a*-190*f* automatically executes routines that designate one of the terminals 190*a*-190*f* as a master device and the remaining devices are designated as slave devices. For example, terminals 190*a* is designated as a master terminal, although any of the terminals 190*a*-190*f* can be initially designated as a master terminal.

In a preferred embodiment, a Bluetooth piconet network is established between the terminals 190*a*-190*f*. A Bluetooth piconet is limited to eight (8) active devices at any one time, one (1) master and seven (7) slaves. However, there can be any number of parked slaves in a piconet (up to 255 that are directly addressable by a parked slave address, but even more addressable by their BD_ADDR). The master can "swap out" active slaves for parked slaves to manage piconets for situations that require a large number of connected devices, i.e., a large number of cargo containers 160 that are conventionally carried by a cargo ship 170. Alternately, smaller piconet networks can be interconnected to form a scatternet.

Master terminal 190*a* communicates with the ship's bridge 180, directly or through another terminal 190, either by making the ship's bridge 180 a member of the Ad-Hoc network or by communication with the ship's bridge through a radio frequency and/or infrared transmission of information.

Intrusion detection sensor 310 is connected to the doors of a shipping container 160 to detect if items have been placed into or taken out of a shipping container 160 after the ship has left port. Preferably, a fiber optic type sensor is used to detect if the door has been opened. Any break in the light transmitted from a transmitter to a receiver indicates that that the door has been opened. A fiber optic intrusion sensor is free from being bypassed, i.e., jumpering a simple electrical switch to avoid tripping an alarm.

The container tracking system 100 will be designed to accept a number of different hazard sensors 320 and other miscellaneous sensors 330. These miscellaneous sensors 330 can be used alone or in combination with hazard sensors 320. Current sensors and expected improvements in this area include:

Nuclear Detectors

Gamma-ray Detectors

Germanium orthogonal strip detectors have the opportunity to provide small and low cost Gamma-ray detectors.

Neutron Detectors

Gallium Arsenide (GaAs)-based detectors with a coating semi-insulating GaAs with isotopically enriched boron or lithium. A neutron striking the coating releases a cascade of charged particles (an alpha particle and a lithium ion in the case of a thermal neutron striking $^{10}B$) which excite free carriers in the GaAs active region. The carriers drift to the detector contacts under an applied voltage and the induced charge is detected and amplified.

Boron-carbide semiconductor diode smaller than a dime, can detect neutrons emitted by the materials that fuel nuclear weapons (University of Nebraska-Lincoln).

Biologic Detectors

Development of ultraviolet semiconductor light sources, including light emitting diodes (LEDs) and laser diodes for detection of bio-agents such as anthrax. The ultraviolet light excites a bio-agent such as anthrax, causing it to give off a light of its own. The biological agent will then emit different wavelength photon. Based on the emitted photon, various bioagents can be detected.

Quantum dots combined with DNA micro-arrays provide a method of biological weapons analysis. A small "field-deployable biological-threat-detection system" will be able to identify different pathogens as well as to distinguish among strains of a single species.

Chemical Detectors

Detectors based on mid-infrared lasers are sensitive to trace chemical amounts. A room-temperature inter-band III-V laser diode that emits at a mid IR wavelength greater using quantum wells grown on a GaSb substrate provides the mechanism to implement a small chemical detector.

The nuclear detectors, gamma-ray neutron detectors, biological and chemical detectors disclosed herein are not intended to be the only hazard detectors that are available for use with the container tracking system 100, but are a small example of possible hazard detectors for use with the container tracking system 100 disclosed herein.

Other miscellaneous sensors 330 envisioned for use with the container tracking system include, e.g., temperature sensors for cargo that is temperature sensitive, moisture sensors for cargo that is moisture sensitive, heart beat sensors and/or $CO_2$ for detection of people and/or animals as cargo, etc.

The master terminal 190*a* takes readings from a GPS satellite system 150 for a determination of the current location of the ship 170. An alarm signal produced by any of the terminals 190*a*-190*f* are relayed, directly or indirectly through other communication paths, to a communications satellite 130, a radio tower 140, a Coast Guard boat 195, and/or a communications buoy 185.

Figure 4:
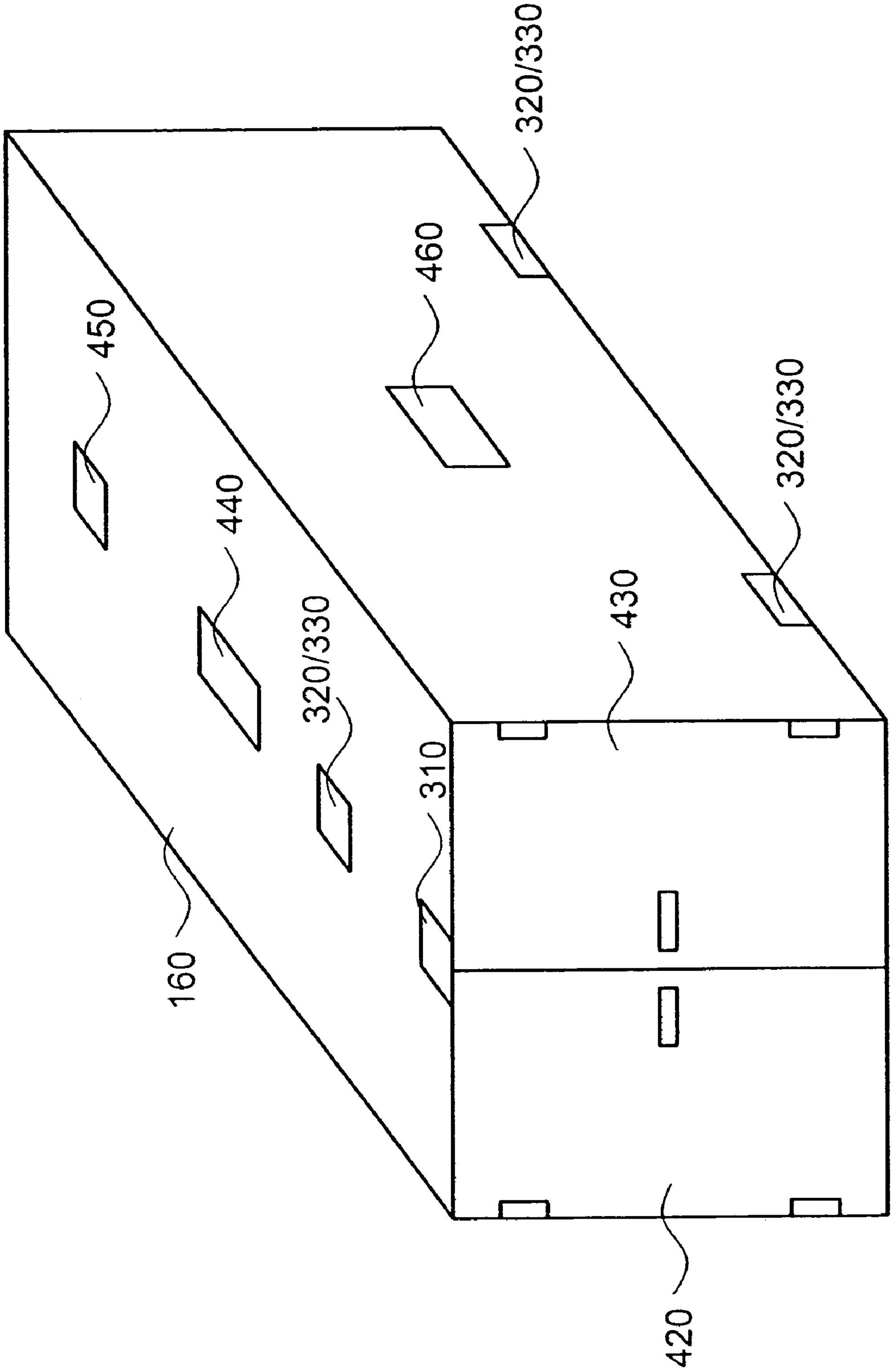
FIG. 4 shows a shipping container, in accordance with the principles of the present invention.

FIG. 4 illustrates a shipping container 160 of the type for use with the container tracking system 100 in accordance with the principles of the present invention.

The shipping container 160 is comprised of an intrusion detection sensor 310, shipping container doors 420 and 430, a communications satellite transmitter 440, a GPS receiver 450, a radio transmitter 460 and hazard sensors 320.

The intrusion detection sensor 310 is preferably placed at a central location in relation to the doors 420 and 430 of the shipping container 160. A central location for the intrusion detection sensor 310 allows a single module to monitor opening of both/either of the two doors 320 and 330, reducing the number of sensors the terminal 190 must interface with, although multiple intrusion detection sensors 310 can be utilized. Alternately, if a shipping container 160 is utilized that has a single door, the intrusion detector sensor 310 can be placed at any convenient location.

The communications satellite transmitter 440 is preferably placed on the top side of the shipping container 160. Since a communications satellite 130 is positioned overhead of the shipping container 160, placing the communications satellite transmitter 440 on top of the shipping container 160 facilitates obtaining the strongest signal from the communications satellite 130.

Likewise, the GPS receiver 450 is preferably placed on the top side of the shipping container 160. Since a GPS satellite system 150 is positioned overhead of the shipping container 160, placing the GPS satellite receiver 450 on top of the shipping container 160 facilitates obtaining the strongest signal from the GPS satellite system 150.

A radio transmitter 460 is preferably placed on the side of the shipping container 160. Since radio communications are terrestrial based communications, placing the radio transmitter 460 on the side of the shipping container 160 facilitates obtaining the strongest signal from a radio tower 140 and/or communications buoy 185.

The hazard sensors 320 are placed at any points within the shipping container 160 that facilitates performing their necessary readings. Although FIG. 4 illustrates the use of a plurality of hazard sensors 320 placed at various points along the walls and floor of the shipping container 160, the placement is exemplary. Alternately, a single housing can be used to house the plurality of hazard sensors 320 and placed at a strategic and/or convenient location in/on the shipping container 160.

Although the satellite communications transmitter 440, GPS receiver 450 and radio transmitter 460 are exemplarily shown respectively on the top and side of the shipping container 160, the satellite communications transmitter 440 and radio transmitter 460 can be attached to the shipping container 160 at any points that are convenient and/or that facilitate communications.

Although FIG. 4 illustrates a single satellite communications transmitter 440, a single GPS receiver and a single radio transmitter 460, any number of satellite communications transmitters 440, GPS receivers and radio transmitters 460 can be used to facilitate the transmission and reception of information. For example, a radio transmitter 460 can be located on all four surrounding sides of the shipping container 160. In this manner, radio communications are optimized for any direction the cargo ship 170 and the shipping container 160 are oriented.

The terminal 190 and radio transmitter 460 will be implemented in a Software Defined Radio (SDR) structure using either conventional or optical processing approaches. This allows the terminal to talk to each of existing Low Earth Orbiting (LEO) Constellations and a GSM or other cell phone interface. The SDR approach allows for future expansion if new systems are brought on-line, protecting infrastructure investment.

The terminal 190 attached to each shipping container 160 utilizes a universal satellite communications interface that communicates with any of the three Low Earth Orbiting (LEO) communication constellations, Iridium, Globalstar, or Orbcomm and geo-synchronous satellites. In addition, terminal 190 utilizes a radio interface, e.g., the GSM or other standard cell phone infrastructure when on or close to shore. Routine ongoing position tracking can be performed utilizing the GPS system, reporting on a regular schedule or in an operator query mode. In the event that an intrusion or hazardous substance is detected by a sensor 320 and/or 330, an alarm signal would be immediately reported via a communications satellite transmitter 440 or a radio transmitter 460 and/or to the ship's bridge 180.

The multi-satellite system interoperability is critical to the container tracking system 100. It provides system level redundancy, i.e., a failure of one constellation (technical or business wise) does not render the system useless. Ancillary advantages include maintaining post deployment cost competitiveness to eliminate a potential monopolistic pricing structure.

Figure 5:
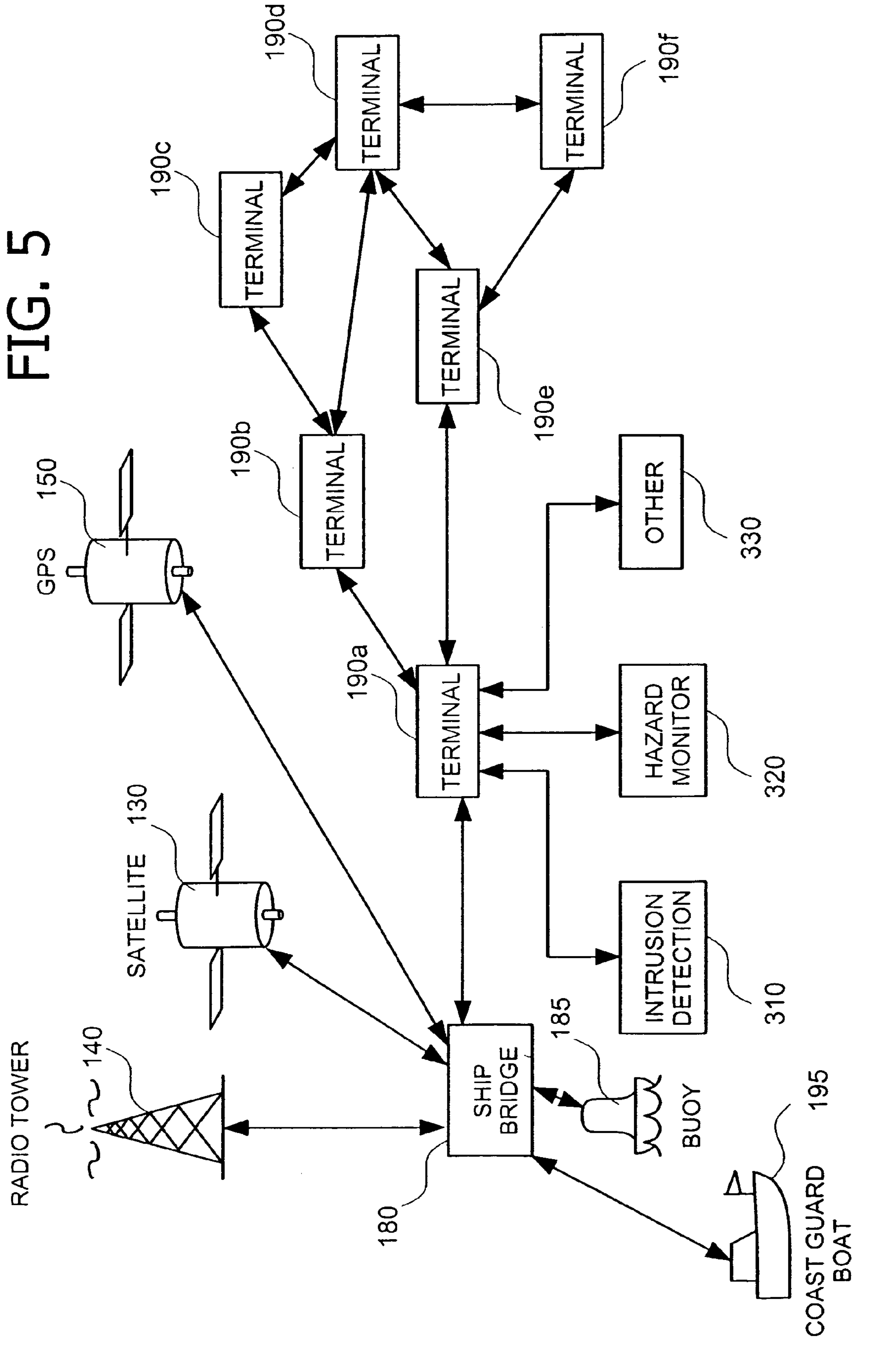
FIG. 5 shows an alternate block diagram of terminal interconnectivity as utilized by the container tracking system, in accordance with the principles of the present invention.

FIG. 5 illustrates an alternate embodiment to the container tracking system 100 as shown in FIG. 3. Terminals 190*a*-190*f* interconnected to form an Ad-Hoc network while in communication with a ship's bridge 180, an intrusion detection sensor 310, a hazard sensor 320, and other miscellaneous sensors 330. In this embodiment, the ship's bridge 180 performs the necessary communications with the radio tower 140, the communications satellite 130, communications buoy 185 and the GPS satellite system 150.

Master terminal 190*a* communicates with the ship's bridge, directly or through another terminal 190, either by making the ship's bridge a member of the Ad-Hoc network or by communication through a radio frequency and/or infrared transmission of information. Any alarm signals produced by any of the terminals 190*a*-190*f* are forwarded to the ship's bridge 180.

The ship's bridge 180 takes readings from the GPS satellite system 150 for a determination of the current location of the ship. An alarm signal produced by any of the terminals 190*a*-190*f* are relayed, directly or indirectly through other communication paths, from the ship's bridge 180 to a communications satellite 130, a radio tower 140, a Coast Guard boat 195, and/or a communications buoy 185.

This alternate embodiment has an advantage of reduced costs for individual terminals 190*a*-190*f* by moving a satellite transmitter 440 and a radio transmitter 460 from the shipping container 160 to the ship's bridge 180.

Figure 6:
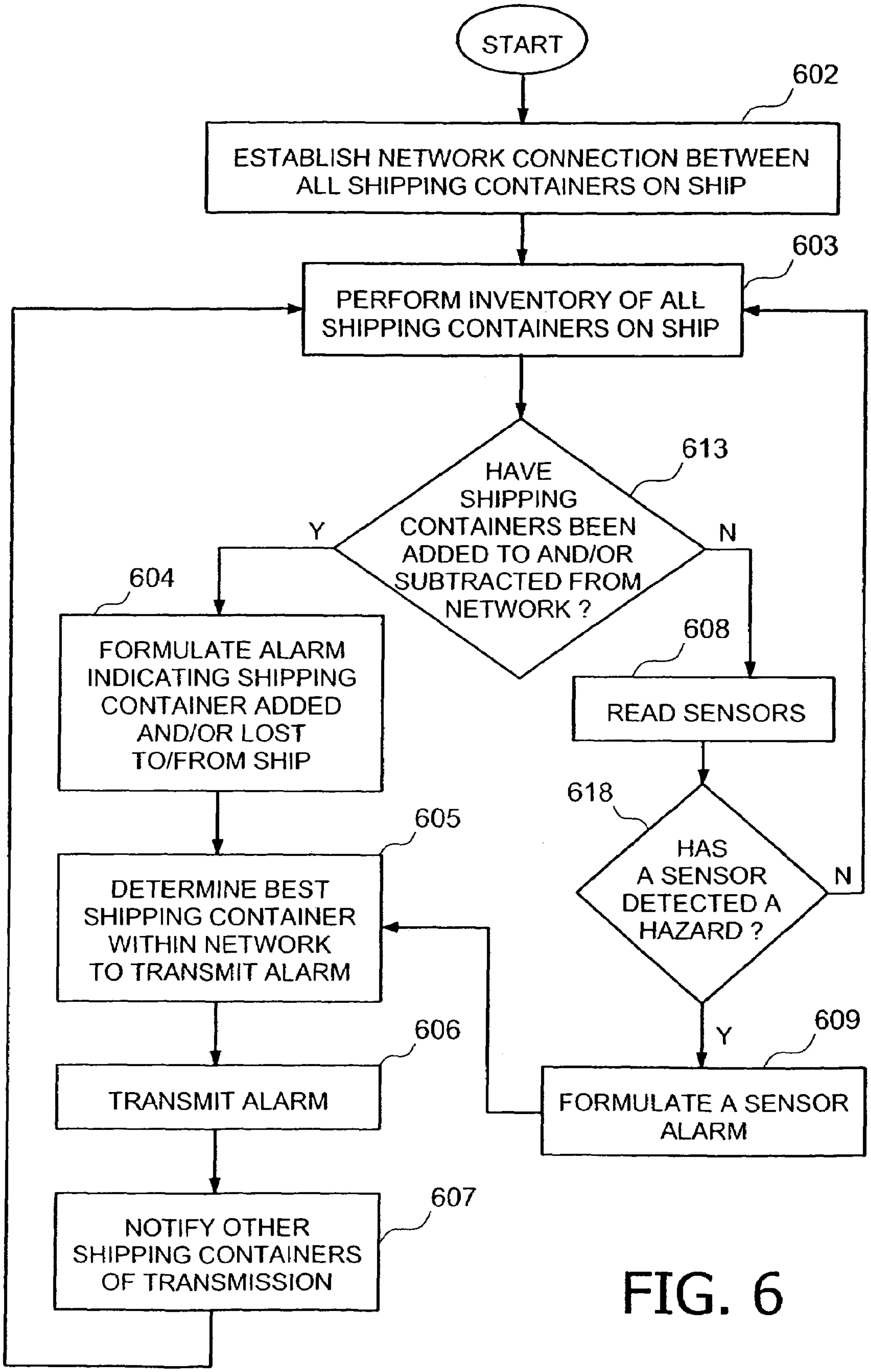
FIG. 6 is a flow chart illustrating an exemplary process by which information is transmitted and received between terminals, a satellite communication system, a GPS satellite system, a radio tower, and a central database as shown in FIGS. 1-4, in accordance with the principles of the present invention.

FIG. 6 is a flow chart illustrating an exemplary process by which information is exchanged between the terminals 190*a*-190*f* attached to shipping containers 160 as shown in FIGS. 1-3, in accordance with the principles of the present invention.

In step 602, a network connection is established between all of the shipping containers 160 on a ship 170.

As discussed above, the network that is established between the shipping containers is an Ad-Hoc network. The Ad-Hoc network is either a hard-wired or a wireless network of shipping containers.

In step 603, an inventory of all the shipping containers 160 that exist on a ship 170 is performed.

The first time step 603 is performed, the initial inventory value when a ship 170 first leaves port is stored for later comparison to an inventory value when the ship 170 is en-route.

When a piconet is employed, the inventory of shipping containers 160 is preferable performed shortly after the ship 170 has left port. Performing the inventory of shipping containers 160 after the ship 170 is at a predetermined distance from other objects prevents other piconet devices from being inadvertently inventoried as belonging to the ship's piconet. The system can monitor RF signal multi-path characteristics between terminals 190 to establish the "crystalline structure" of an array of shipping containers 160. If a container 160 is added and/or subtracted, this will be reported for investigation.

In step 613, a decision is made if a shipping container 160 has been added or subtracted from the Ad-Hoc network. The decision is made by comparing the initial inventory value taken when the ship 170 left port to an updated inventory value taken when a ship is en-route.

If a shipping container 160 has been added to the Ad-Hoc network after an initial inventory, a hazardous substance or a hazardous item has possibly been added to the ship's inventory, requiring investigation. Likewise, if a shipping container 160 has been subtracted from the ship's inventory, possibly a hazardous substance or a hazardous item has been removed from the ship 170, requiring investigation.

If the determination in step 613 is that a shipping container 160 has been added or subtracted from the ship's inventory, the process branches to step 604. In step 604, an alarm is formulated indicating that that a shipping container 160 has been added or subtracted from the ship's inventory.

In step 605, a subroutine is executed for a determination as to which terminal 190 attached to a shipping container 160 within the Ad-Hoc network is optimally used to transmit the alarm signal.

A more detailed flow chart for subroutine 605 is described in FIG. 7 and its accompanying text below.

In step 606, the alarm signal is transmitted using whatever communications path was determined as available in step 605.

In step 607, the terminal 190 that transmitted the alarm signal informs other terminals 190 that the alarm signal has been transmitted. This prevents the other terminals 190 from re-executing subroutine 605, indicating a communications path was not available the previous instance it was executed.

The process branches back to step 603 to repeat the process of determining if a shipping container 160 has been added to subtracted from the ship's inventory and/or if a hazard sensor has produced an alarm.

If the determination in step 613 is that a shipping container has not been added or subtracted from the ship's inventory, the process branches to step 608. In step 608, a reading is made of the sensors 320 and 330 attached to the shipping container 160 terminal 190.

In step 618, a decision is made based on the reading of sensors 320 and 330 attached to the shipping container 160 terminal 190 performed by step 608. If a sensor has detected an abnormality associated with a shipping container 160, e.g., detection of a hazardous substance, a shipping container 160 has been opened en-route, etc. the process branches to step 609.

If none of the sensors 320 and 330 attached to the shipping containers detect an abnormality, the process branches back to step 603 where the process for determining if a shipping container 160 has been added or subtracted from the ship's inventory and reading of terminal 190 sensors 320 and 330 is repeated.

Figure 7:
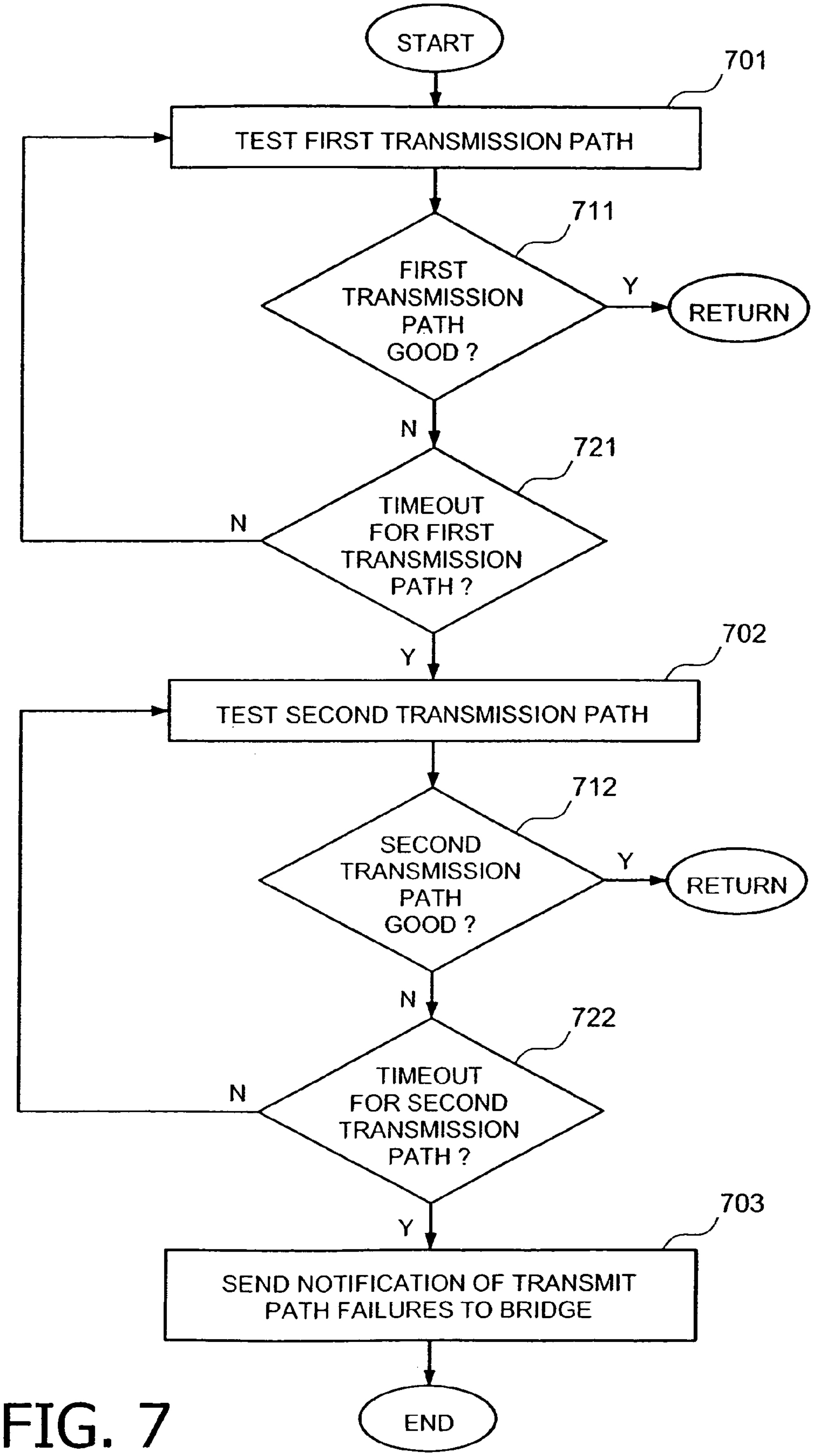
FIG. 7 is a flow chart of a subroutine for determining a best shipping container within an Ad-Hoc network to transmit a hazard signal.

FIG. 7 is a flow chart illustrating subroutine 605 discussed above in FIG. 6 in more detail, in accordance with the principles of the present invention.

In step 701, a test is performed of a preferred transmission path, e.g., a satellite transmission path 130.

In step 711, a decision is made based on the test performed in step 701. If the first transmission path is a good communications path, the subroutine ends and process flow returns to the process that called the subroutine with an indication as to the transmission path to use to transmit an alarm signal. If the decision in step 711 is that the first transmission path is not a good communications path, the process branches to step 721.

In step 721, a decision is made if the number of times a first transmission path has been tested has reached a predetermined value. If the number of times the first transmission path has been tested has not reached the predetermined value, the process branches back to step 701. If the number of times the first transmission path has been tested has reached the predetermined value, the process branches to step 702.

In step 702, a test is performed of an alternate transmission path, e.g., a radio transmission path 140.

In step 712, a decision is made based on the test performed in step 702. If the alternate transmission path is a good communications path, the subroutine ends and process flow returns to the process that called the subroutine with an indication as to the transmission path to use to transmit an alarm signal. If the decision in step 712 is that the alternate transmission path is not a good communications path, the process branches to step 722.

In step 722, a decision is made if the number of times an alternate transmission path has been tested has reached a predetermined value. If the number of times the alternate transmission path has been tested has not reached the predetermined value, the process branches back to step 702. If the number of times the alternate transmission path has been tested has reached the predetermined value, the process branches to step 703.

In step 703, a notification is sent to the ship's bridge that an alarm signal could not be transmitted from the ship.

Although the exemplary process shown in FIG. 7 shows two potential transmission paths for the transmission of an alarm signal, the number of possible transmission paths is only limited by the number of transmission paths a shipping container 160 terminal 190 and/or a ship's bridge 180 subscribers to.

Figure 8:
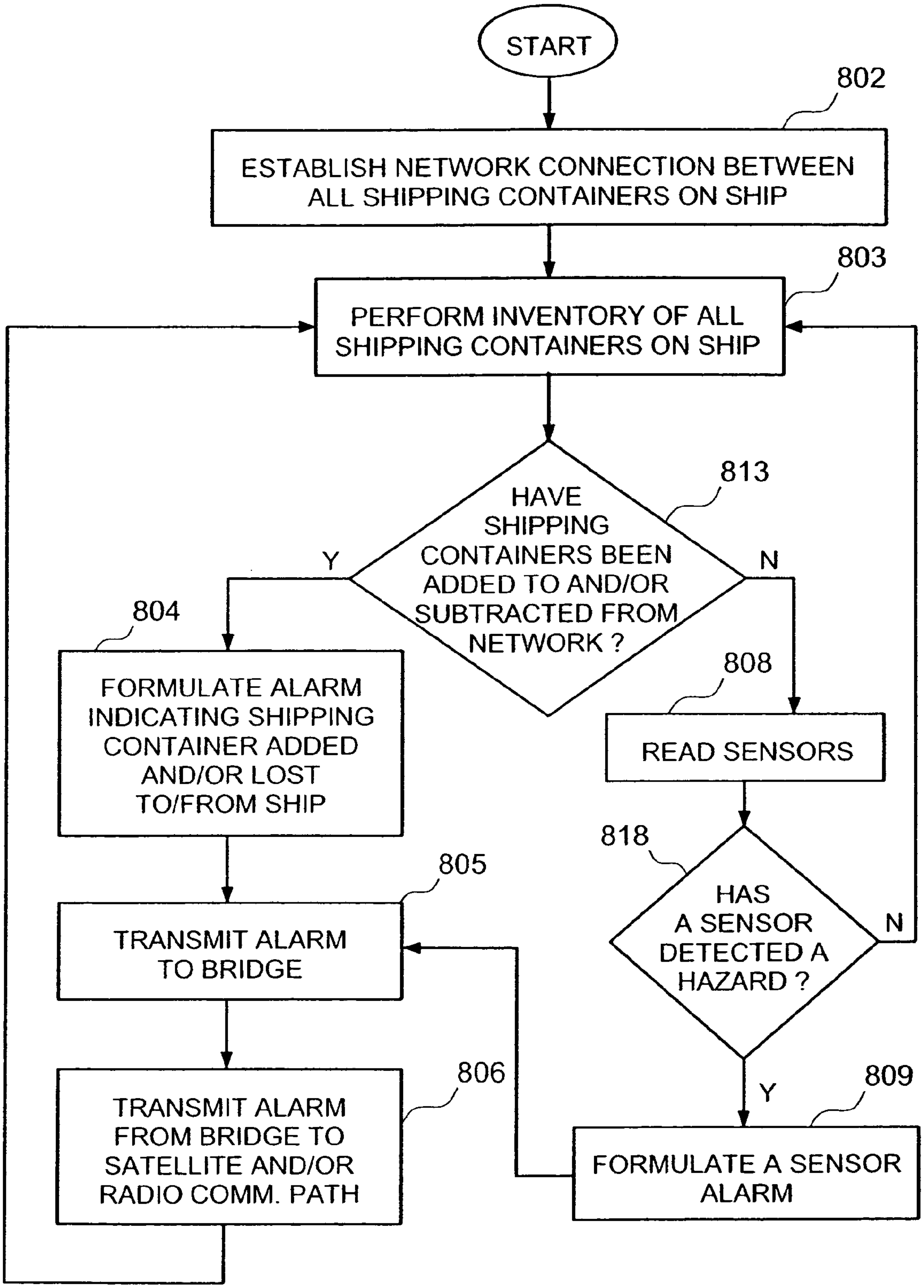
FIG. 8 is a flow chart illustrating an exemplary process by which information is transmitted and received between terminals, a satellite communication system, a GPS satellite system, a radio tower, a ship's bridge, and a central database as shown in FIGS. 1, 2, 4 and 5, in accordance with the principles of the present invention.
Figure 9:
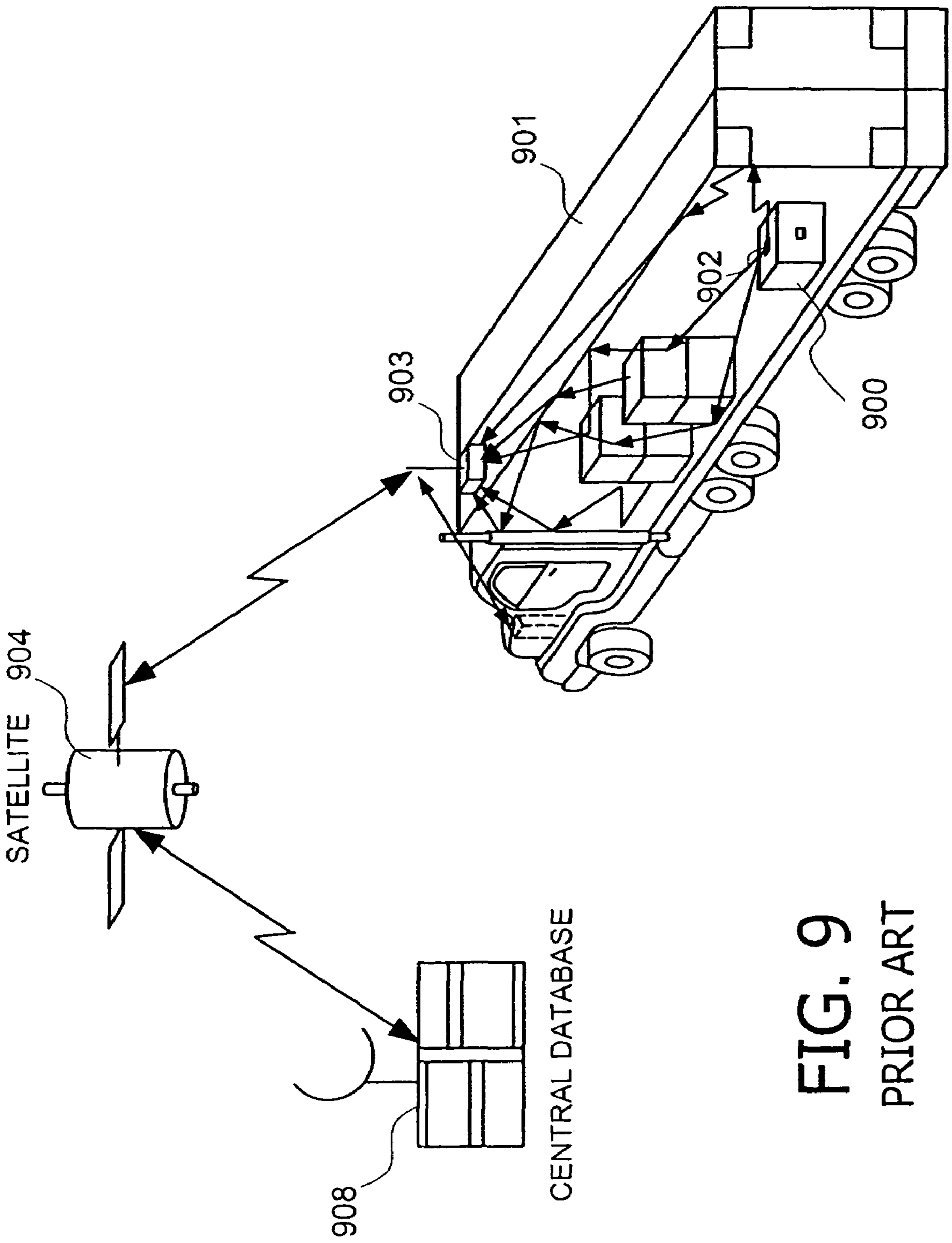
FIG. 9 PRIOR ART
FIG. 9 shows a conventional hazard detection system for delivery of a package using a truck.
Figure 10:
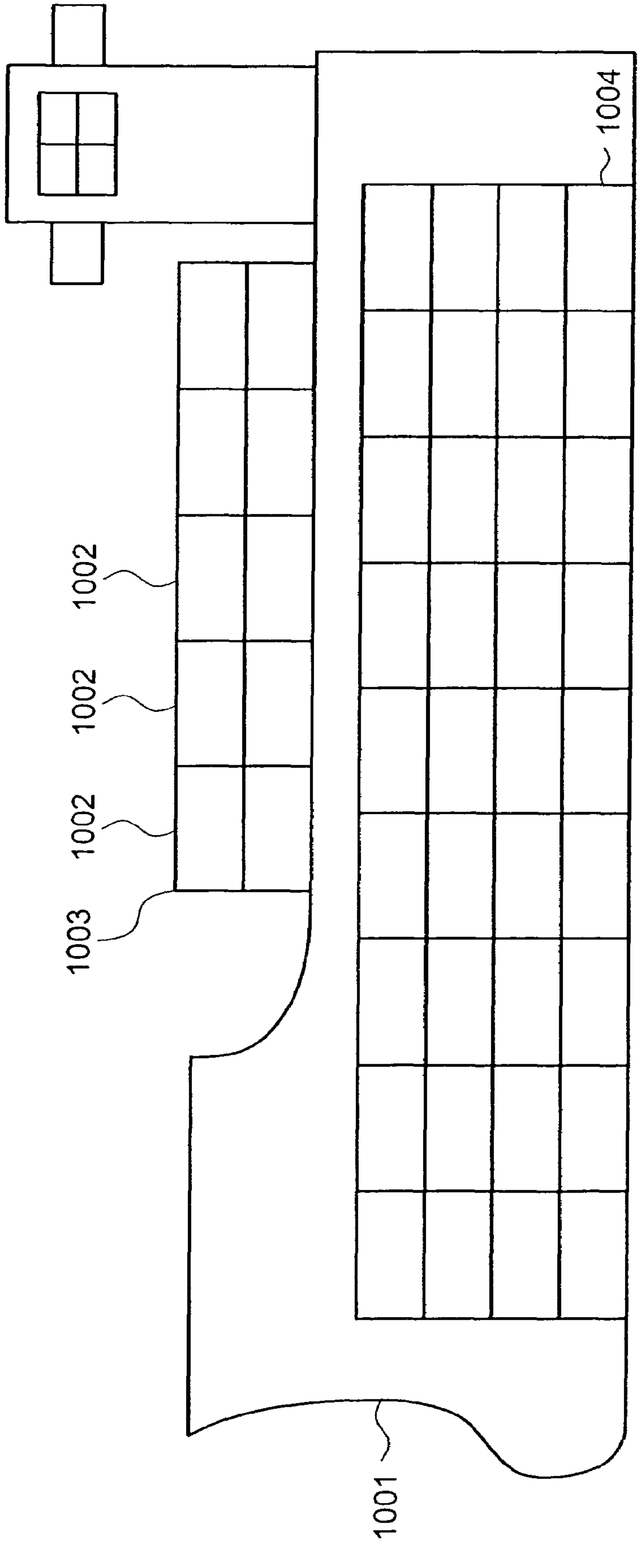
FIG. 10 PRIOR ART
FIG. 10 shows a conventional cargo ship carrying conventional shipping containers.

FIG. 8 is a flow chart illustrating an exemplary process by which information is exchanged between the terminals 190*a*-190*f* attached to shipping containers 160 as shown in FIGS. 1, 2 and 5, in accordance with the principles of the present invention.

In step 802, a network connection is established between all of the shipping containers 160 on a ship 170.

As discussed above, the network that is established between the shipping containers is an Ad-Hoc network. The Ad-Hoc network is either a hard-wired or a wireless network of shipping containers.

In step 803, an inventory of all the shipping containers 160 that exist on a ship 170 is performed.

The first time step 803 is performed, the initial inventory value when a ship 170 first leaves port is stored for later comparison to an inventory value when the ship 170 is en-route.

When a piconet is employed, the inventory of shipping containers 160 is preferable performed shortly after the ship 170 has left port. Performing the inventory of shipping containers 160 after the ship 170 is at a predetermined distance from other objects prevents other piconet devices from being inadvertently inventoried as belonging to the ship's piconet.

In step 813, a decision is made if a shipping container 160 has been added or subtracted from the Ad-Hoc network. The decision is made by comparing the initial inventory value taken when the ship 170 left port to an updated inventory value taken when a ship is en-route.

If a shipping container 160 has been added to the Ad-Hoc network after an initial inventory, a hazardous substance or a hazardous item has possibly been added to the ship's inventory, requiring investigation. Likewise, if a shipping container 160 has been subtracted from the ship's inventory, possibly a hazardous substance or a hazardous item has been removed from the ship 170, requiring investigation.

If the determination in step 813 is that a shipping container 160 has been added and/or subtracted from the ship's inventory, the process branches to step 804. In step 804, an alarm is formulated indicating that that a shipping container 160 has been added and/or subtracted from the ship's inventory.

In step 805, an alarm signal is transmitted, either directly or through other shipping containers 160, to the ship's bridge 180.

In step 806, the alarm signal is transmitted from the ship's bridge 180 using whatever communications path that is desirable and/or available, e.g., a radio communication path and/or a satellite communication path, to a desired destination location, e.g., a central database 110. The ship's bridge 180 performs a subroutine similar to the one shown in FIG. 7 for determining a best transmission path to transmit a hazard signal.

The process branches back to step 803 to repeat the process of determining if a shipping container 160 has been added to subtracted from the ship's inventory and/or if a hazard sensor has detected an alarm condition.

If the determination in step 813 is that a shipping container has not been added or subtracted from the ship's inventory, the process branches to step 808. In step 808, a reading is made of the sensors 320 and 330 attached to the shipping container 160 terminal 190.

In step 818, a decision is made based on the reading of sensors 320 and 330 attached to the shipping container 160 terminal 190 performed by step 808. If a sensor has detected an abnormality associated with a shipping container 160, e.g., detection of a hazardous substance, a shipping container 160 has been opened en-route, etc. the process branches to step 809.

If none of the sensors 320 and 330 attached to the shipping containers detect an abnormality, the process branches back to step 803 where the process for determining if a shipping container 160 has been added or subtracted from the ship's inventory and reading of terminal 190 sensors 320 and 330 is repeated.

Preferably, the shipping container 160 terminal 190 is powered by a suitable power source. For instance, long life batteries (e.g., Lithium batteries) are preferred, but rechargeable batteries, and/or solar power is possible either instead of batteries or in addition to batteries as is somewhat common in some dual powered calculators.

In accordance with the principles of the present invention, a same shipping container 160 terminal 190 can be used on multiple ships without reconfiguration, since each use a standardized Ad-Hoc network protocol.

In accordance with the principles of the present invention, information passing between shipping container 160 terminals 190 and/or information passing between the shipping container 160 terminal 190 and the central database 110 is preferably encrypted. Encryption ensures that that alarm signals produced by sensors 320 and 330 are reliably transmitted within the Ad-Hoc network and/or to the central database 110.

In accordance with the principles of the present invention, terminal 190 interrogation capability is provided on Coast Guard 195 or other government related vessels to verify system functionality and/or to detect anomalies prior to the cargo ship entering port facilities.

In accordance with the principles of the present invention, a log of anomalies is stored at a central point on the ship 170 and/or at each of the terminals 190 during transport by the ship 170. When the shipping containers 160 are off-loaded from the ship 170 at a shipping yard or rail yard, data from the terminals 190 is downloaded and check for anomalies detected during transport.

While the invention has been described with reference to the exemplary embodiments thereof, those skilled in the art will be able to make various modifications to the described embodiments of the invention without departing from the true spirit and scope of the invention.

What is claimed is:

1. A shipping container tracking system, comprising:

at least one shipping container sensor adapted to be attached to a first shipping container to sense a national security condition of said first shipping container;

a first communication adapter associated with said first shipping container constructed and arranged to adaptively communicate said national security condition of said first shipping container with a second communication adapter associated with a second shipping container; and a central database to receive said at least one shipping container sensor data;

wherein said central database verifies a content of said first shipping container by processing said national security condition of said first shipping container against a shipping manifest database.

2. A shipping container tracking system, comprising:

at least one shipping container sensor adapted to be attached to a first shipping container to sense at least one of a condition of said first shipping container and a condition of at least one item within said first shipping container;

a shipping container communication adapter to adaptively communicate with a second shipping container; and a line of intermediary communications buoys placed at sea at appropriate locations to at least one of test said container tracking system functionality and to detect anomalies at a safe distance from port facilities.

3. A method of distributing data obtained from sensors adaptively attached to a shipping container comprising:

establishing a network connection between a first shipping container and a second shipping container;

transmitting sensor data from said first shipping container to said second shipping container if said sensor attached to said first shipping container detects a hazard and said first shipping container is unable to transmit its sensor data to at least one of an off ship transmission path and a shipboard system; and at least one of testing and detecting a container tracking system functionality and anomalies at a safe distance from port facilities by a line of intermediary communications buoys placed at sea at appropriate locations.

* * * * *